United States Patent
Williams et al.

(10) Patent No.: US 11,554,688 B2
(45) Date of Patent: Jan. 17, 2023

(54) DETACHABLE VEHICLE SEAT

(71) Applicant: TS TECH CO., LTD., Asaka (JP)

(72) Inventors: Carl Williams, Columbus, OH (US); Jacob Williams, Columbus, OH (US); Adam Greening, Reynoldsburg, OH (US); Vipul Khinvasara, Columbus, OH (US); James Denlinger, Columbus, OH (US)

(73) Assignee: TS TECH CO., LTD., Saitama (JP)

( * ) Notice: Subject to any disclaimer, the term of this patent is extended or adjusted under 35 U.S.C. 154(b) by 425 days.

(21) Appl. No.: 16/797,338

(22) Filed: Feb. 21, 2020

(65) Prior Publication Data

US 2020/0269725 A1 Aug. 27, 2020

Related U.S. Application Data

(60) Provisional application No. 62/809,850, filed on Feb. 25, 2019.

(51) Int. Cl.
*B60N 2/02* (2006.01)
*B60N 2/015* (2006.01)
*B60N 2/90* (2018.01)
*B60N 2/20* (2006.01)

(52) U.S. Cl.
CPC ....... *B60N 2/01516* (2013.01); *B60N 2/0232* (2013.01); *B60N 2/0244* (2013.01); *B60N 2/20* (2013.01); *B60N 2/919* (2018.02); *B60N 2002/0264* (2013.01); *B60N 2002/952* (2018.02)

(58) Field of Classification Search
CPC .. B60N 2/01516; B60N 2/919; B60N 2/0232; B60N 2/0244; B60N 2/20; B60N 2002/952; B60N 2002/0264
See application file for complete search history.

(56) References Cited

U.S. PATENT DOCUMENTS

| 6,520,581 B1 * | 2/2003 | Tame ..................... B60N 2/305 |
| | | 297/378.12 |
| 7,086,696 B2 | 8/2006 | Yudovich |
| 7,121,624 B2 * | 10/2006 | Pejathaya .............. B60N 2/206 |
| | | 297/331 |
| 7,270,361 B2 | 9/2007 | Oishi et al. |

(Continued)

FOREIGN PATENT DOCUMENTS

JP 2006188210 A 7/2006

*Primary Examiner* — Philip F Gabler
(74) *Attorney, Agent, or Firm* — Armstrong Teasdale LLP

(57) ABSTRACT

A detachable vehicle seat includes: a seat cushion including a seat latch for selectively securing the seat cushion to a vehicle body, and a seat control device for selectively unlatching the seat latch; a seatback pivotally attached to the seat cushion via a recliner device, the recliner device including a recliner control device configured to selectively cause the recliner device to be in a first state for locking the seatback in an upright position and a second state for locking the seatback in a stowage position; a first connecting element connecting the recliner device to the seat control device so that the seat latch can be unlatched only when the recliner device is in the second state; and a second connecting element connecting the seat latch to the recliner control device so that the recliner device can take the first state only when the seat latch is fully latched.

9 Claims, 8 Drawing Sheets

(56) References Cited

U.S. PATENT DOCUMENTS

| | | | | |
|---|---|---|---|---|
| 7,434,862 B2* | 10/2008 | Lutzka | ................... | B60N 2/305 |
| | | | | 297/336 |
| 7,588,282 B2* | 9/2009 | Kolena | ................. | B60N 2/309 |
| | | | | 296/65.09 |
| 8,360,528 B2* | 1/2013 | Shinohara | .......... | B60N 2/01583 |
| | | | | 296/65.09 |
| 8,523,262 B2* | 9/2013 | Haeske | ................ | B60N 2/3011 |
| | | | | 296/65.09 |
| 10,065,548 B2* | 9/2018 | Dunn | .................... | B60N 2/305 |

* cited by examiner

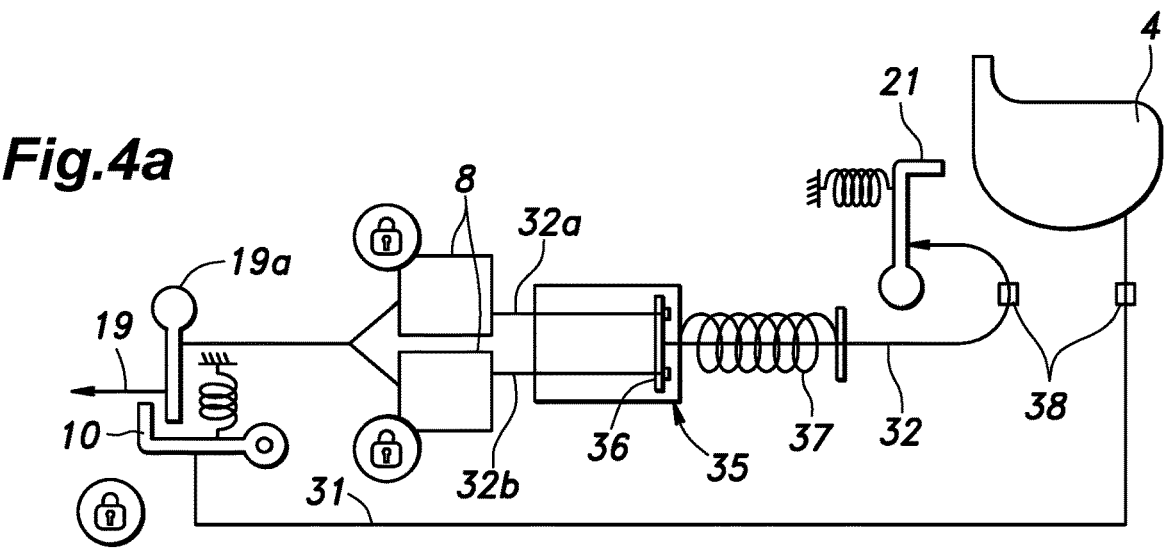
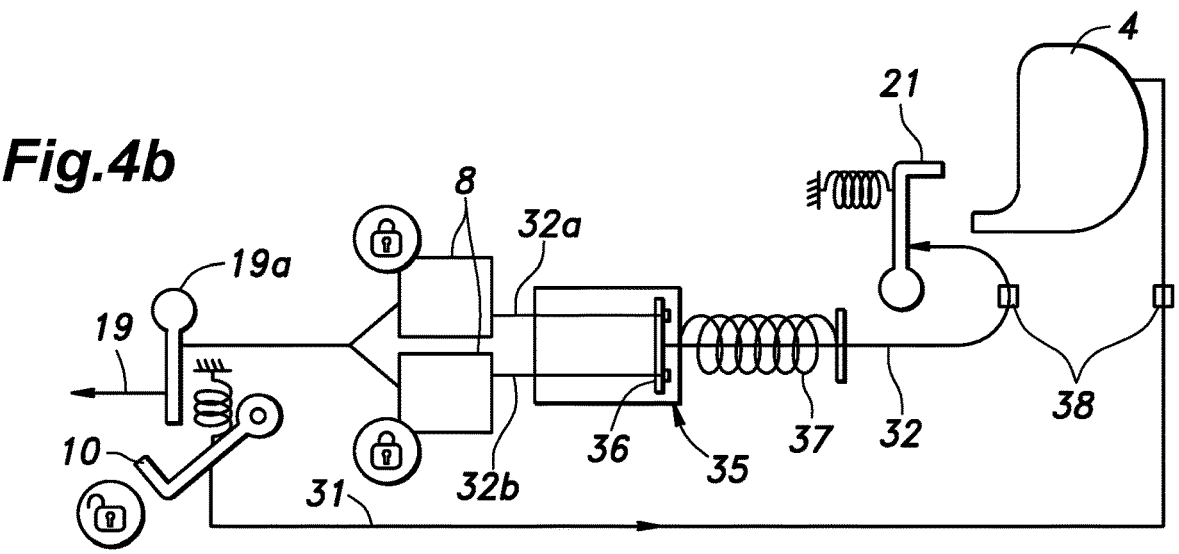
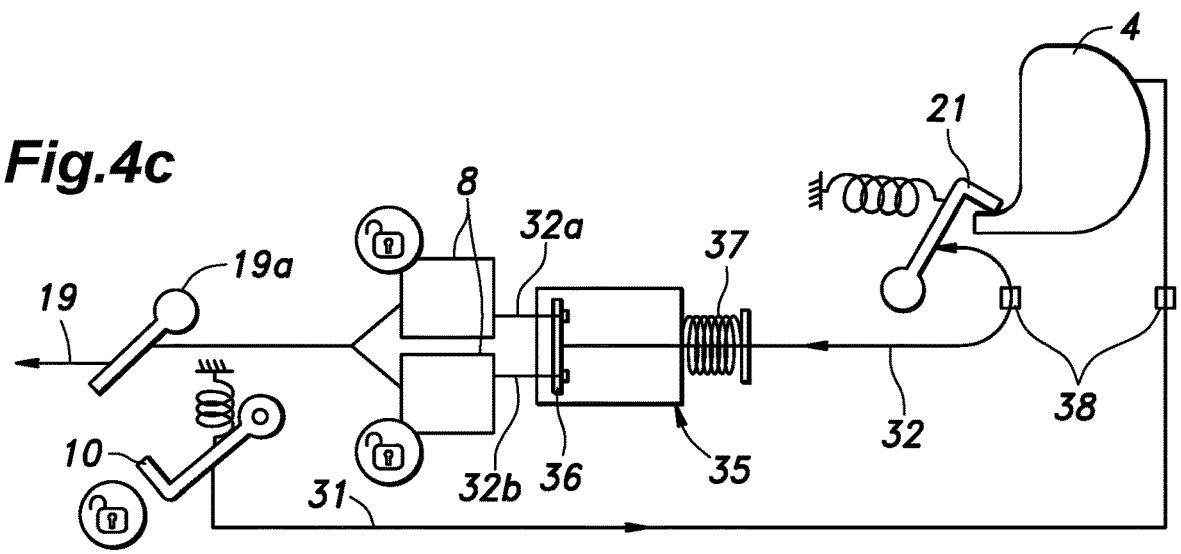

DETACHABLE VEHICLE SEAT

CROSS-REFERENCE TO RELATED APPLICATION

This application claims priority to U.S. Provisional Application No. 62/809,850 filed on Feb. 25, 2019, the contents of which are hereby expressly incorporated by reference in its entirety.

TECHNICAL FIELD

The present invention relates to a detachable vehicle seat which can be selectively detached from the vehicle.

BACKGROUND ART

It is known to configure some of the seats in a vehicle to be detachable. By removing the seats, the available cabin space can be increased. The space made available by removing the seats can be used as a cargo space or for other purposes. U.S. Pat. No. 7,270,361B2 discloses a detachable vehicle seat which includes a seat base having a pair of legs detachably attached to the floor. The seat cushion is detachably attached to the seat base. Inadvertent detachment of the seat from the floor is prevented by placing a first operation element for releasing the legs from the floor and a second operation element for releasing the seat cushion from the seat base in a seatback support provided in the seat base position which is not readily accessible for the seat occupant.

However, this prior art requires the user to remove the seat cushion from the seat base, and then to remove the seat base from the floor in order to remove the seat as a whole. Therefore, the user has to experience the inconvenience of handling the seat itself and the seat base.

Also, it is desirable for a detachable vehicle seat to have features that ensure a correct use. For instance, the seat cushion is required to be properly latched to the floor for the user to be seated on the vehicle seat, and to be prevented from being inadvertently unlatched from the floor during use.

SUMMARY OF THE INVENTION

In view of such a problem of the prior art, a primary object of the present invention is to provide a detachable vehicle seat which can be detached from and attached to the vehicle body with ease.

A second object of the present invention is to provide a detachable vehicle seat which can prevent inadvertent detachment from the vehicle body.

To achieve such objects, an embodiment of the present invention provides a detachable vehicle seat, comprising: a seat cushion (2) provided with a seat latch (8) for selectively securing the seat cushion to a vehicle body, the seat latch being provided with a seat control device (A; 10, 19a) for selectively unlatching the seat latch; a seatback (3) pivotally attached to the seat cushion via a recliner device (4) so as to be moveable between an upright use position and a folded stowage position, the recliner device being provided with a recliner control device (B; 20, 21) configured to selectively cause the recliner device to be in a first state for locking the seatback in the upright use position and a second state for locking the seatback in the folded stowage position; a first connecting element (31) connecting the recliner device to the seat control device (seat blocking member 10) so that the seat latch can be unlatched only when the recliner device is in the second state (seatback in the folded stowage position); and a second connecting element (32) connecting the seat latch to the recliner control device (20, 21) so that the recliner device can take the first state (seatback in the upright use position) only when the seat latch is fully latched.

Thus, the seatback can be brought to the upright use position only when the seat latch is fully latched so that the occupant is prevented from being seated unless the seat latch is fully latched. Also, the seat latch is prevented from being inadvertently unlatched as long as the seatback in the upright use position, or, in other words, the occupant is properly seated on the vehicle seat.

Preferably, the upright use position includes a plurality of angular positions of the seatback relative to the seat cushion which can be selected via the recliner device.

Thereby, the user can be comfortably seated in the vehicle seat with a desired reclining angle of the seatback.

Preferably, the seat latch includes a pair of seat latches provided on either side of the seat cushion, and the seat latches are connected to the recliner control device so that the recliner device can take the first state only when the seat latches are both fully latched.

By using a pair of seat latches, the seat cushion can be securely attached to a part of the vehicle body such as a floor. By requiring both of the seat latches to be fully latched for the seatback to be placed in a position suitable for an occupant to be seated, the occupant is prevented from being seated unless the seat cushion is properly latched to the floor.

Preferably, the seat control device includes a seat control member (19a) for selectively latching and unlatching the seat latch, and a seat blocking member (10) that can be selectively activated so as to keep the seat control member from unlatching the seat latch, and the first connecting element is connected to the seat blocking member. Preferably, additionally, the recliner control device includes a recliner control member (20) for selectively permitting positioning of the seatback between the upright use position and the folded stowage position, and a recliner blocking member (33) that can be selectively activated so as to prevent the recliner control member from causing the seatback to take the upright use position, and the second connecting element is connected to the recliner blocking member.

Thereby, the desirable interlocking arrangement between the recliner device and the seat latch can be achieved by using a relatively simple mechanical arrangement.

Preferably, the seat latch includes a rotatable hook member (13) supported by the seat cushion so as to be rotatable between an engaged position for engaging a striker (7) attached to the vehicle body and a disengaged position for disengaging the striker, a cam member (16) rotatably supported by the seat cushion so as to be rotatable between a retaining position for retaining the hook member in the engaged position and a release position for releasing the hook member from the engaged position, a spring member (17) connected between the hook member and the cam member so as to urge the hook member toward the engaged position and the cam member toward the retaining position; and an unlatching control member (19) connected to the cam member so as to rotate the cam member toward the release position when the unlatching control cable is pulled.

Thereby, the seat latch can be formed in a simple structure.

Preferably, the first connecting element comprises a first control cable (31) connected between the seat blocking member and the recliner device, and the second connecting element comprises a second control cable (32) connected between the seat latch (hook plate 13) and the recliner blocking member.

Thereby, the interlocking arrangement can be realized both in a simple and reliable manner.

Preferably, at least one of the first control cable and the second control cable includes a tension compensator.

Thereby, the variations in the tension applied to the control cable can be accommodated so that the reliable operation of the vehicle seat can be ensured.

Preferably, the seat control member and the recliner control member each include an electrical actuator, and the first connecting element and the second connecting element comprise electric wires.

Thereby, the structure of the vehicle seat can be simplified.

Thus, the present invention provides a detachable vehicle seat that can be detached from and attached to the vehicle body with ease, and can prevent inadvertent detachment from the vehicle body.

BRIEF DESCRIPTION OF THE DRAWING(S)

FIG. 4a is a diagram illustrating the overall structure of the vehicle seat in a normal use condition;

FIG. 4b is a diagram illustrating the overall structure of the vehicle seat when the recliner control member is operated;

FIG. 4c is a diagram illustrating the overall structure of the vehicle seat when pulling the unlatching control cable;

DESCRIPTION OF THE PREFERRED EMBODIMENT(S)

Figure 1:
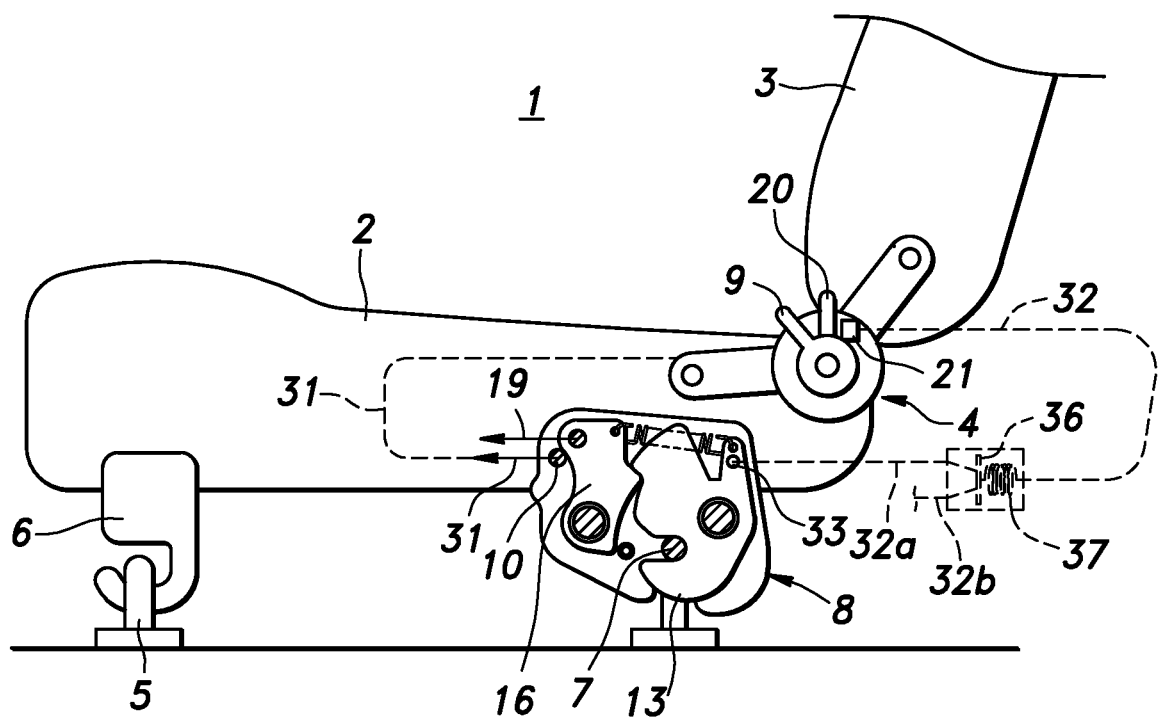
FIG. 1 is a simplified side view of a detachable vehicle seat according to a first embodiment of the present invention.

A preferred embodiment of the present invention is described in the following with reference to the appended drawings.

The vehicle seat 1 according to the preferred embodiment of the present invention includes a seat cushion 2 detachably secured to the floor of the vehicle body, and a seatback 3 pivotally connected to the seat cushion 2 via a recliner device 4. The recliner device 4 allows the seatback 3 to be in an upright use position shown in FIG. 1, and in a folded stowage position in which the seatback 3 is folded onto the seat cushion 2. When the seatback 3 is in the upright use position, the recliner device 4 allows the angular position of the seatback 3 to be adjusted over a prescribed angular range by operating a recliner adjustment lever 9 in a per se known manner.

The seat cushion 2 is provided with a pair of front hooks 6 (only one of them is shown in FIG. 1) provided on either side of a front part of the seat cushion 2, and each configured to be hooked onto a corresponding front striker 5 fixedly secured to the floor, and a pair of seat latches 8 provided on either side of a rear part of the seat cushion 2, and each configured to be engaged to a corresponding rear striker 7 fixedly secured to the floor.

Figure 2:
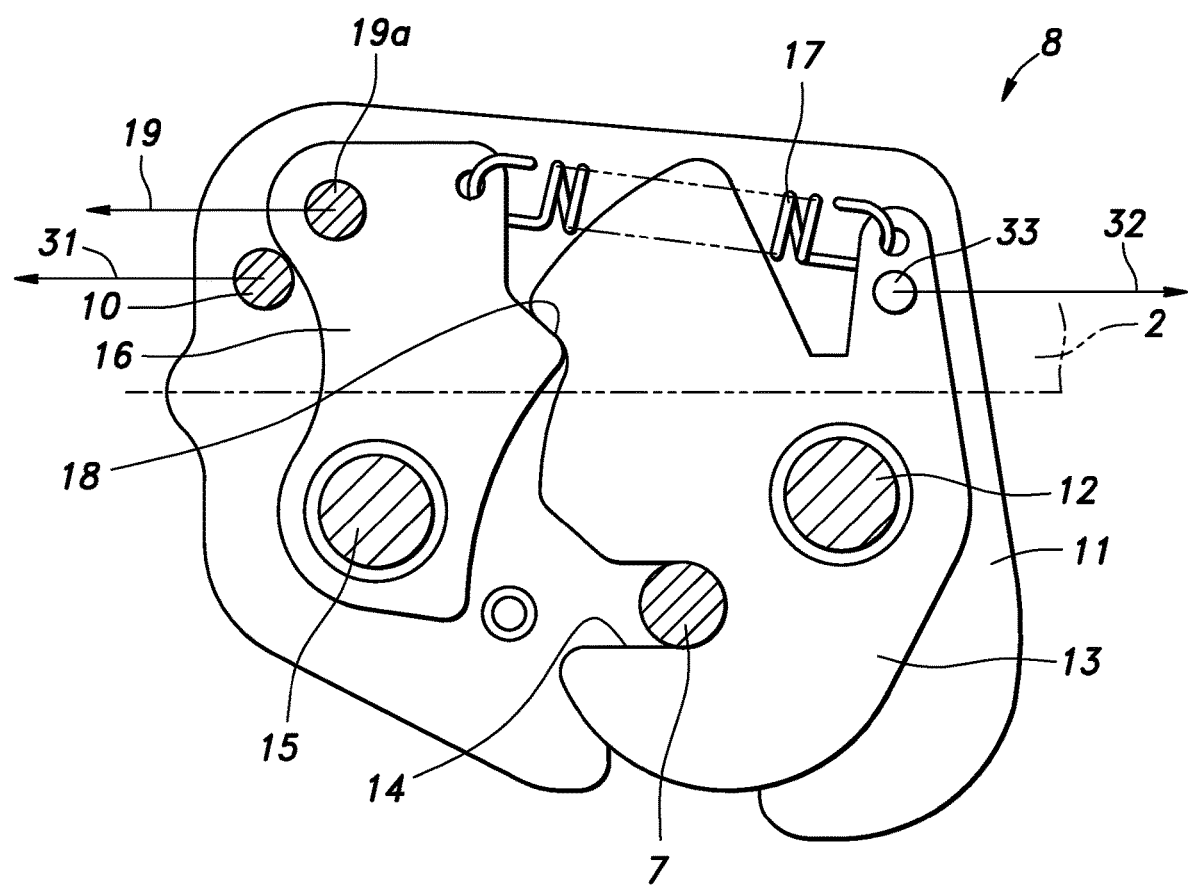
FIG. 2 is a simplified view of a seat latch.

As shown in FIG. 2, each seat latch 8 includes a base plate 11 fixedly secured to a structural member of the seat cushion 2, a hook plate 13 rotatably supported by the base plate 11 via a pivot shaft 12 and provided with a slot 14 for selectively engaging the rear striker 7, a cam plate 16 rotatably supported by the base plate 11 via another pivot shaft 15, and provided with an abutting surface 18 configured to engage a corresponding abutting surface provided on the hook plate 13, a tension coil spring 17 engaged between the hook plate 13 and the cam plate 16 so as to urge the hook plate 13 toward the engaged position and the cam plate 16 toward a retaining position where an abutting surface 18 provided on the cam plate 16 abuts against a corresponding abutting portion of the hook plate 13 so as to keep the hook plate 13 in the engaged position.

The seat latch 8 is further provided with an unlatching control cable 19 connected to the cam plate 16 via an unlatching control member 19a thereof. When the unlatching control cable 19 is pulled, the cam plate 16 is rotated against the spring force of the tension coil spring 17 so that the abutting surface 18 of the cam plate 16 is disengaged from the corresponding abutting surface of the hook plate 13. As a result, the hook plate 13 is caused to be rotated under the spring force of the tension coil spring 17 in a direction to disengage the slot 14 of the hook plate 13 from the rear striker 7. Thus, the seat latch 8 is disengaged from the rear striker 7 (an unlatched state). In the disengaged state of the seat latch 8, when the rear striker 7 is forced into the slot 14 of the hook plate 13, the hook plate 13 is caused to be rotated against the spring force of the tension coil spring 17, and this in turn causes the abutting surface 18 of the cam plate 16 to be engaged by the corresponding abutting surface of the hook plate 13. As a result, the rear striker 7 is kept engaged by the slot 14 of the hook plate 13 (a latched state).

The seat latch 8 is further provided with a seat blocking member 10 which can be selectively projected from the base plate 11 so as to block the movement of the cam plate 16 in the direction to disengage the abutting surface 18 of the cam plate 16 from the corresponding abutting surface of the hook plate 13. The seat blocking member 10 is normally in a blocking position to block the movement of the cam plate 16 so that the seat latch 8 cannot be unlatched (kept latched), and can be moved to a release position to allow the movement of the cam plate 16 and allow the seat latch 8 to be unlatched when a first control cable 31 connected to the seat blocking member 10 is pulled. A combination of the seat blocking member 10 and the unlatching control member 19a may be referred to as a seat control device.

The recliner device 4 is provided with a recliner control member 20 permitting the movement of the seatback 3 between the folded stowage position and the upright use position, and a recliner blocking member 21 which selectively prohibits the movement of the seatback 3 from the folded stowage position to the upright use position by engaging the recliner control member 20. Unless the recliner control member 20 is operated, the seatback 3 remains locked in either the folded stowage position or the upright use position. The recliner blocking member 21 is normally in a blocking position to block the movement of the seatback 3 from the folded stowage position to the upright use position, but can be moved to a release position to allow the movement of the seatback 3 from the folded stowage position to the upright use position when a second control cable 32 connected to the recliner blocking member 21 is pulled. Thus, when the recliner blocking member 21 is deactivated, the seatback 3 can be moved between the folded stowage position to the upright use position by operating the recliner control member 20. When the recliner blocking member 21 is activated, the seatback 3 is held at either the folded stowage position or the upright use position. A combination of the recliner control member 20 and the recliner blocking member 21 may be referred to as a seat control device.

FIGS. 3a to 3f show the changes in the position of the seatback 3 and the state of the seat latches 8 during the process of removing the vehicle seat 1 and reinstalling the vehicle seat 1 from and to the floor of the vehicle, and FIGS. 4a to 4f show the mode of operation of the various parts of the vehicle seat 1 during this process.

As shown in FIG. 4a, the first control cable 31 connected to the seat blocking member 10 at one end thereof is connected to the recliner device 4 in such a manner that the first control cable 31 is not pulled when the recliner device 4 is in a first state for locking the seatback in the upright use position, and is pulled when the recliner device 4 is in a second state for locking the seatback in the folded stowage position. When the first control cable 31 is pulled, the seat blocking member 10 is displaced so as to permit the unlatching control cable 19 to unlatch the seat latches 8. Conversely, when the first control cable 31 is not pulled, the seat blocking member 10 is positioned so as to prohibit the unlatching control cable 19 from unlatching the seat latches 8.

The second control cable 32 which is connected to the recliner blocking member 21 at one end thereof is connected to the full latch indicating member 33 provided on the hook plate 13 in such a manner that the second control cable 32 is pulled when the seat latch 8 is not fully latched or unlatched, and the second control cable 32 is not pulled by the full latch indicating member 33 when the seat latch 8 is fully latched.

When the second control cable 32 is pulled, the recliner blocking member 21 prevents the seatback 3 from being moved from the folded stowage position to the upright use position (and from the upright use position to the folded stowage position). Conversely, when the second control cable 32 is not pulled, the recliner blocking member 21 allows the seatback 3 to be moved from the folded stowage position to the upright use position (and from the upright use position to the folded stowage position).

The mode of operation of the detachable vehicle seat of the illustrated embodiment is described in the following with reference to FIGS. 3a to 3f, and FIGS. 4a to 4f.

Figure 3A:
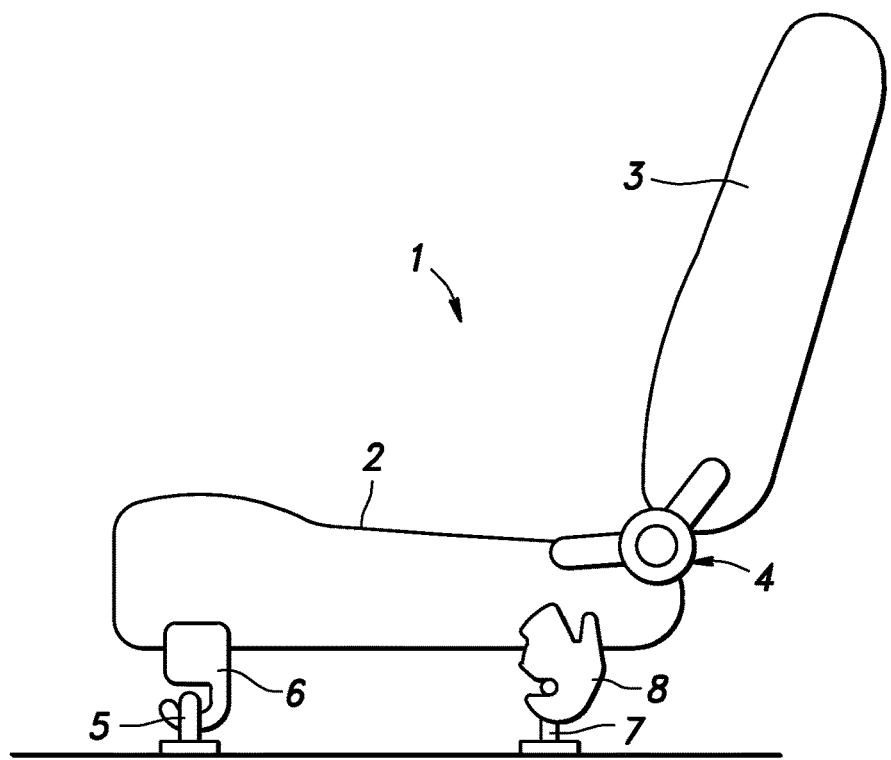
FIG. 3a is a diagram illustrating the vehicle seat in a normal use condition.

FIG. 3a and FIG. 4a show the vehicle seat 1 in a normal use condition. The seat latches 8 are fully latched, and the second control cable 32 is not pulled so that the recliner device 4 can be placed in the first state for locking the seatback 3 in the upright use position or the second state for locking the seatback in the folded stowage position by operating the recliner control member 20. When the seatback 3 is in the upright use position, the recliner device 4 allows the reclining angle of the seatback to be adjusted by using the recliner adjustment lever 9 within a prescribed range in a per se known manner.

Figure 3B:
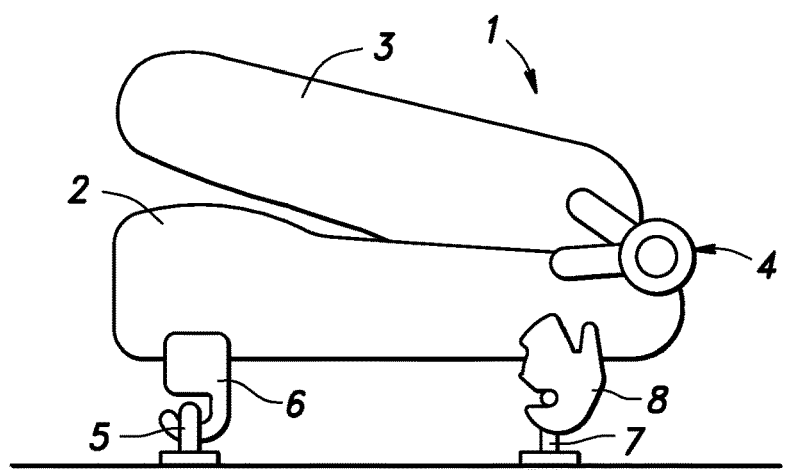
FIG. 3b is a diagram illustrating the seatback folded onto the seat cushion.
Figure 3C:
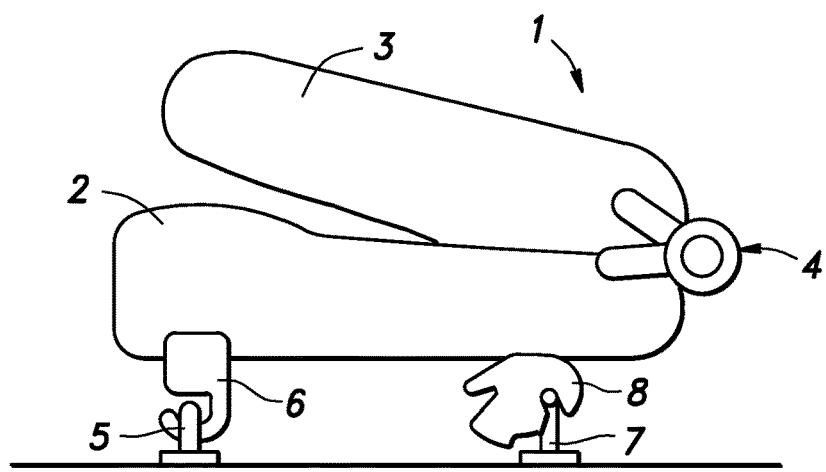
FIG. 3c is a diagram illustrating unlatching of the seat latch.

When the recliner control member 20 is operated, and the seatback 3 is folded onto the seat cushion 2 as shown in FIG. 3b and FIG. 4b, the first control cable 31 is pulled so that the seat latches 8 can be unlatched by pulling the unlatching control cable 19 as shown in FIG. 3c and FIG. 4c. The unlatching of the seat latches 8 causes the second control cable 32 to be pulled with the result that the recliner blocking member 21 locks the seatback 3 in the folded stowage position.

Figure 3D:
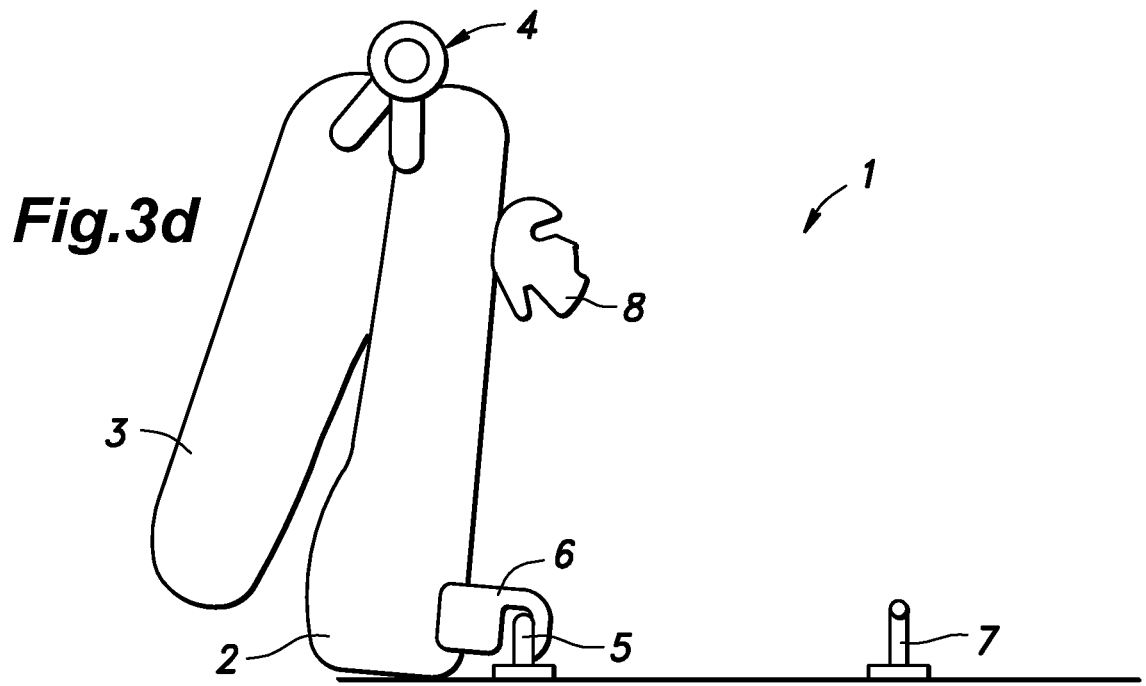
FIG. 3d is a diagram illustrating removal of the seat from the floor.
Figure 4D:
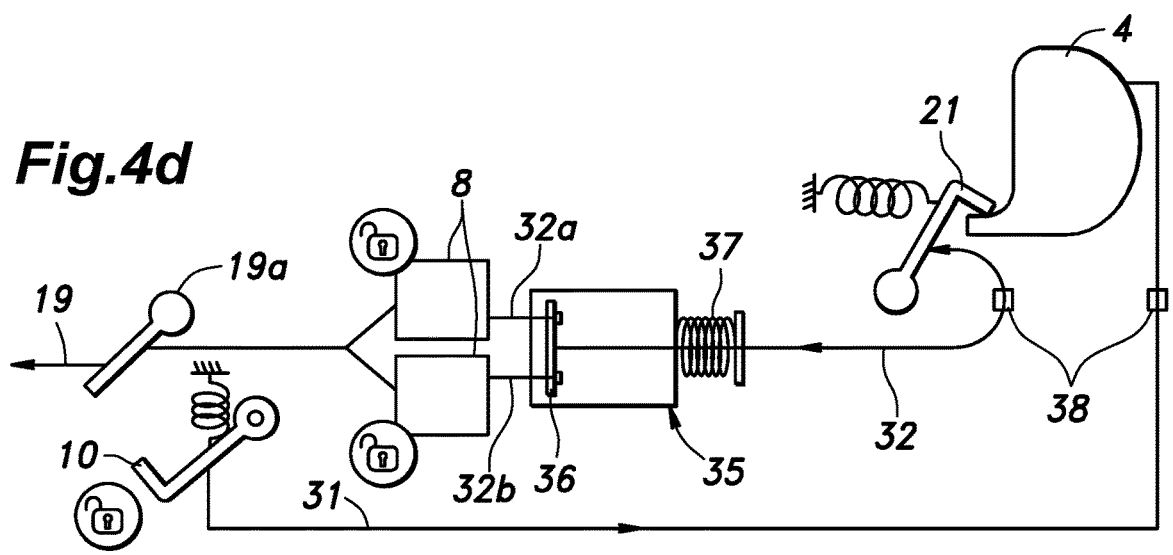
FIG. 4d is a diagram illustrating the overall structure of the vehicle seat when the seat is removed from the floor.

Thus, the seat 1 can be removed from the floor as shown in FIG. 3d and FIG. 4d. Under this condition, since the seat latches 8 are unlatched, the recliner device 4 prevents the seatback 3 from being raised to the upright use position.

Figure 3E:
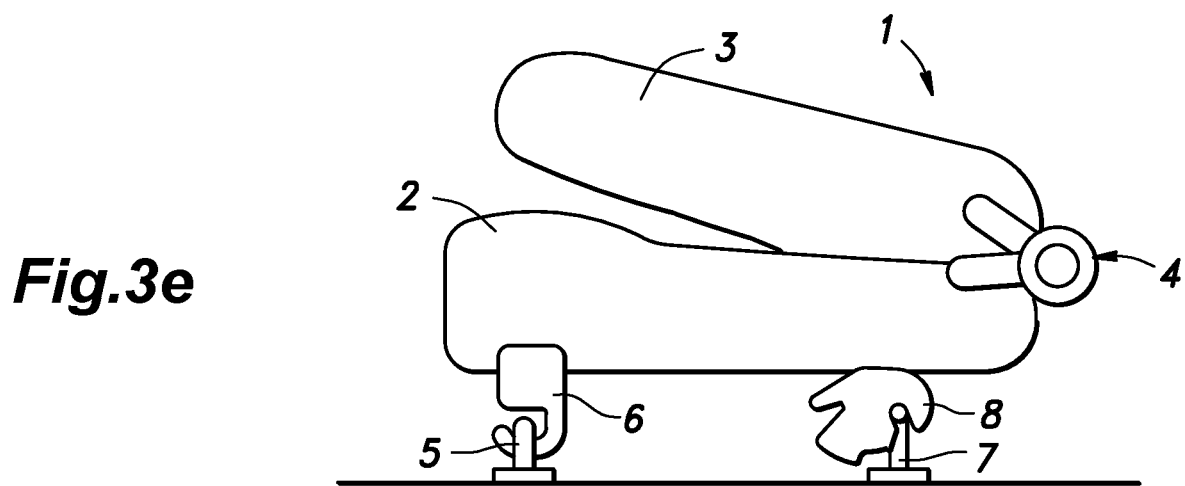
FIG. 3e is a diagram illustrating the seat put back on the floor with the seat latches not fully latched.
Figure 3F:
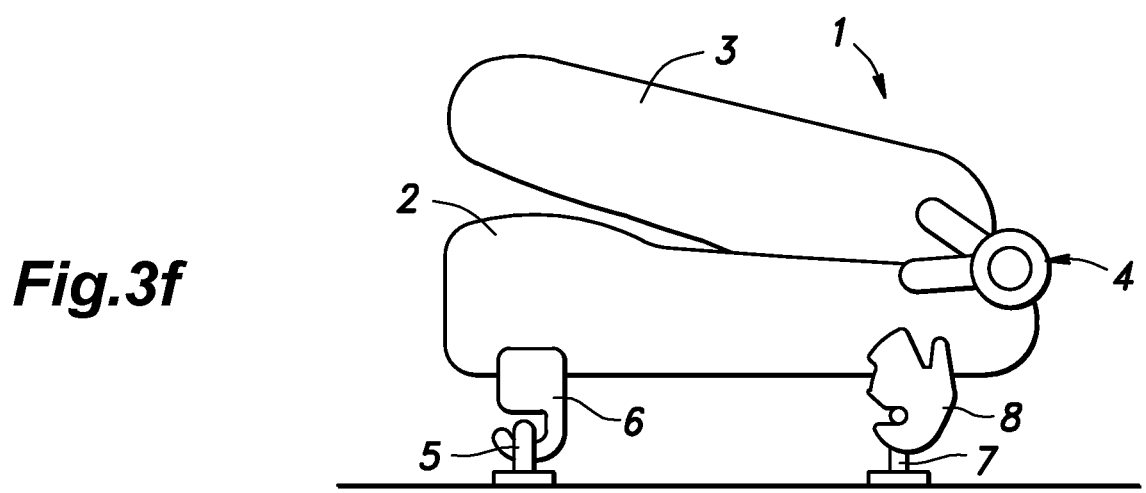
FIG. 3f is a diagram illustrating the seat put back on the floor with the seat latches fully latched.
Figure 4E:
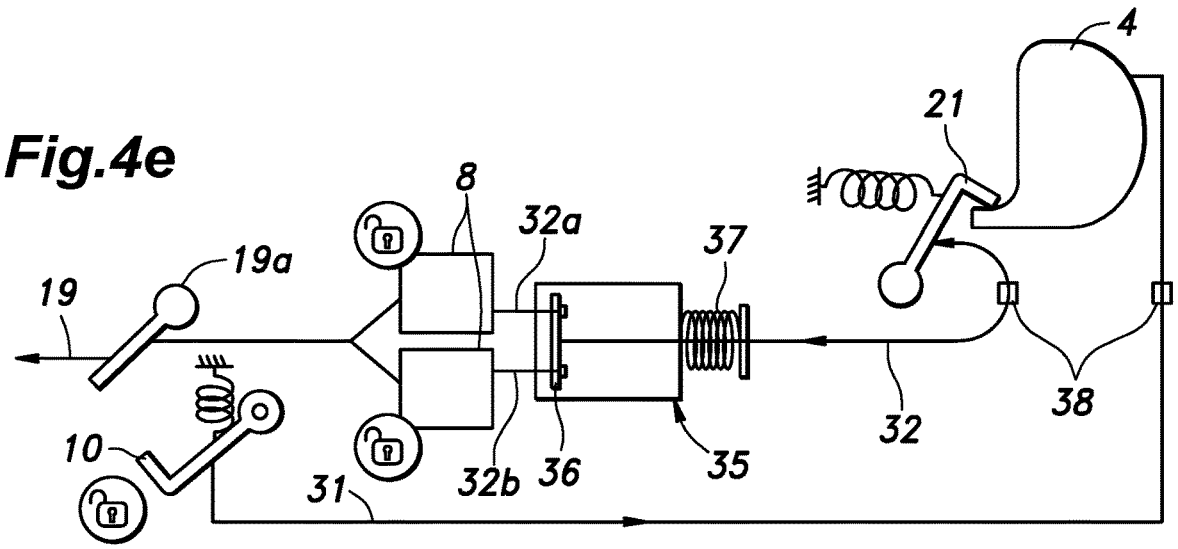
FIG. 4e is a diagram illustrating the overall structure of the vehicle seat when the seat is put back on the floor with the seat latches not fully latched.
Figure 4F:
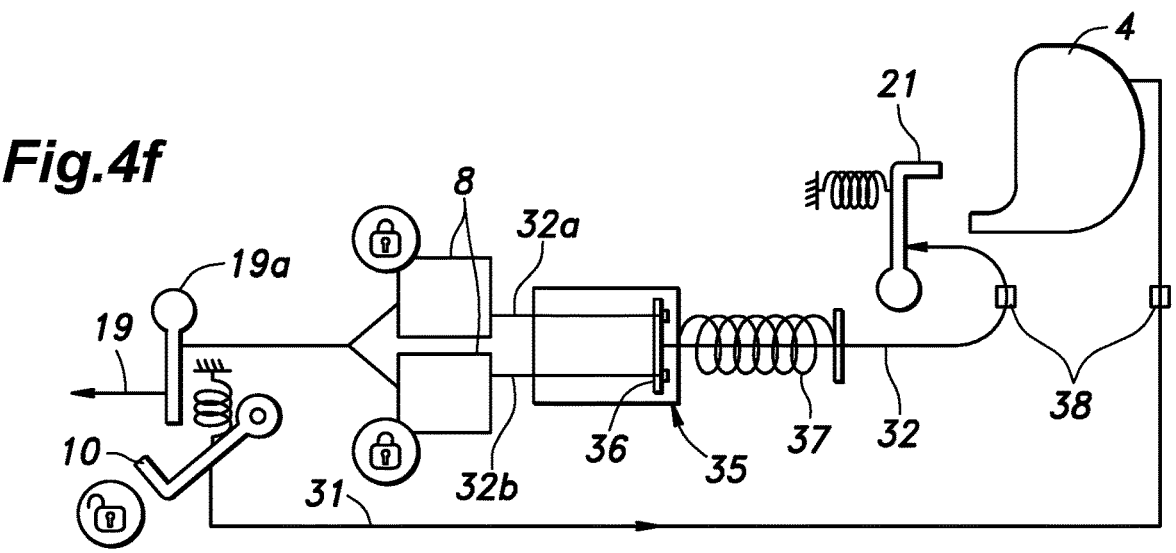
FIG. 4f is a diagram illustrating the overall structure of the vehicle seat when the seat is put back on the floor with the seat latches fully latched.

FIG. 3e and FIG. 4e show the seat 1 put back on the floor, but the seat latches 8 are not yet fully latched. Under this condition, the recliner device 4 still prevents the seatback 3 from being raised to the upright use position FIG. 3f and FIG. 4f show the vehicle seat 1 put back on the floor, and the seat latches 8 fully latched. Since the second control cable 32 is not pulled at this time, the recliner device 4 allows the seatback 3 to be raised from the folded stowage position to the upright use position. Thus, only when the seat 1 is properly latched to the floor, the seatback 3 can be properly positioned for seating (upright use position) so that the occupant is prevented from being seated with the seat latches 8 not fully latched. Also, for the vehicle seat 1 to be unlatched from the floor, the seatback 3 is required to be folded onto the seat cushion 2 (folded stowage position) so that the inadvertent unlatching of the seat 1 from the floor can be avoided as long as the occupant is properly seated on the seat 1.

Figure 5:
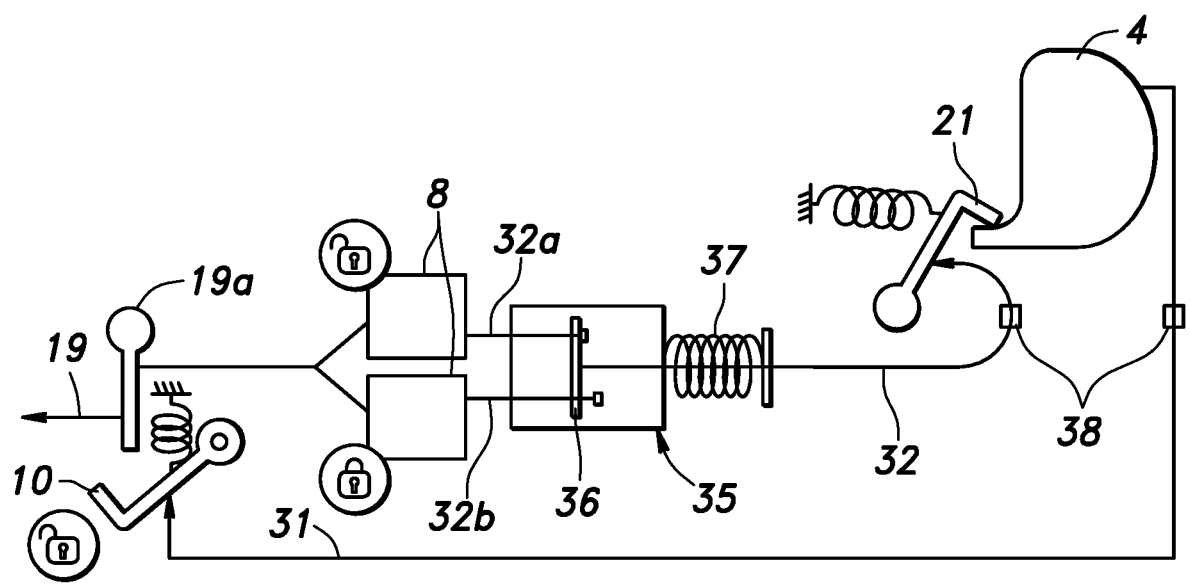
FIG. 5 is a view similar to FIGS. 4a to 4f showing an additional feature to the illustrated embodiment.

FIG. 5 shows a state where only one of the seat latches 8 is fully latched while the other seat latch 8 is only partially latched. According to the illustrated embodiment, the second control cable 32 is pulled when at least one of the seat latches 8 is fully latched. This can be accomplished, for instance, by connecting the second control cable 32 to the cam plates 13 via a OR device 35 which requires at least one of the hook plates 13 to be in an unlatched position for the second control cable 32 to be pulled. In other words, the recliner blocking member 21 is kept in the blocking position prohibiting the movement of the seatback 3 from the folded stowage position when at least one of the seat latches 8 is left unlatched. Thus, the seat laches 8 are required to be both latched for the seatback 3 to be moved between the folded stowage position and the upright use position.

In this case, the second control cable 32 extending from the recliner blocking member 21 is connected to a middle point of a bar 36, and the two end points of the bar 36 are connected to the respective hook plates 13 via respective sections 32a and 32b of the second control cable 32. When the hook plates 13 have rotated to the fully latched positions, the bar 36 is displaced so as to cause the second control cable 32 to be pulled. When only one of the cam plates 13 has rotated to the fully latched position, and the other hook plate 13 has not rotated to the fully latched position, the bar 36 is still pulled by the corresponding hook plate 13, and the bar 36 is displaced in such a manner that the second control cable 32 is kept pulled.

In order to ensure the proper operation of the first control cable 31 and the second control cable 32, a tension compensator 38 such as the one disclosed in JP2006-188210A with reference to FIG. 9 may be provided in a suitable part of each control cable so that the proper operation of the vehicle seat 1 can be achieved without running the risk of damaging the control cables.

Figure 6:
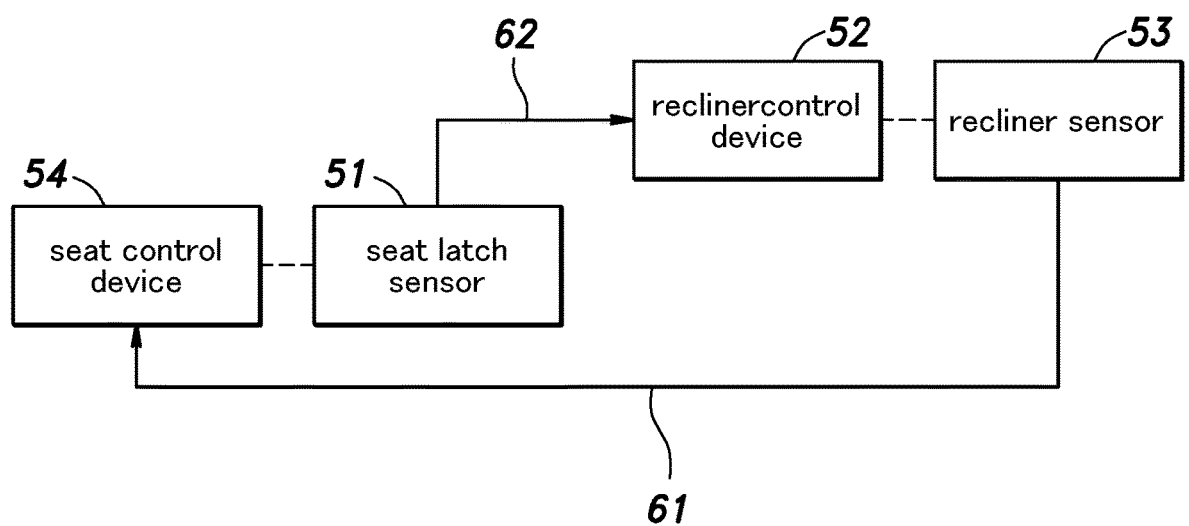
FIG. 6 is a block diagram showing a second embodiment of the present invention.

FIG. 6 shows a second embodiment of the present invention implemented by using electric actuators and electric sensors. Each seat latch 8 of the vehicle seat 1 is provided with a seat latch sensor 51 for detecting the fully latched state of the seat latch 8. The recliner device 4 of the vehicle seat 1 is provided with a recliner control device 52 that selectively causes the recliner device 4 to be in a first state for locking the seatback 3 in the upright use position and a second state for locking the seatback 3 in the folded stowage position, and a recliner sensor 53 that detects the position of the seatback 3 to be either the upright use position or the folded stowage position. The seat latches 8 are each further provided with a seat control device 54 which selectively prohibits the unlatching of the seat latch 8.

A first control line 61 is connected between the recliner sensor 53 and the seat control device 54 so that the seat latch 8 can be unlatched only when the recliner device 4 is in the second state. A second control line 62 is connected between the seat latch sensor 51 and the recliner control device 52 so that the recliner device 4 can take the first state only when the seat latch 8 is fully latched.

The present invention has been described in terms of specific embodiments, but is not limited by such embodiments, and can be modified in various ways without departing from the spirit of the present invention.

The invention claimed is:

1. A detachable vehicle seat, comprising:
a seat cushion provided with a seat latch for selectively securing the seat cushion to a vehicle body, the seat latch being provided with a seat control device for selectively unlatching the seat latch;
a seatback pivotally attached to the seat cushion via a recliner device so as to be moveable between an upright use position and a folded stowage position, the recliner device being provided with a recliner control device configured to selectively cause the recliner device to be in a first state for locking the seatback in the upright use position and a second state for locking the seatback in the folded stowage position;
a first connecting element connecting the recliner device to the seat control device so that the seat latch can be unlatched only when the recliner device is in the second state; and
a second connecting element connecting the seat latch to the recliner control device so that the recliner device can take the first state only when the seat latch is fully latched,
wherein the recliner control device includes a recliner control member for selectively permitting positioning of the seatback between the upright use position and the folded stowage position, and a recliner blocking member that can be selectively activated so as to prevent the recliner control member from causing the seatback to take the upright use position, and the second connecting element is connected to the recliner blocking member.

2. The detachable vehicle seat according to claim 1, wherein the upright use position includes a plurality of angular positions of the seatback relative to the seat cushion which can be selected via the recliner device.

3. The detachable vehicle seat according to claim 1, wherein the seat latch includes a pair of seat latches provided on either side of the seat cushion, and
the seat latches are connected to the recliner control device so that the recliner device can take the first state only when the seat latches are both fully latched.

4. The detachable vehicle seat according to claim 1, wherein the seat control device includes a seat control member for selectively latching and unlatching the seat latch, and a seat blocking member that can be selectively activated so as to keep the seat control member from unlatching the seat latch, and the first connecting element is connected to the seat blocking member.

5. The detachable vehicle seat according to claim 4, wherein the seat latch includes a rotatable hook member supported by the seat cushion so as to be rotatable between an engaged position for engaging a striker attached to the vehicle body and a disengaged position for disengaging the striker,
a cam member rotatably supported by the seat cushion so as to be rotatable between a retaining position for retaining the hook member in the engaged position and a release position for releasing the hook member from the engaged position,
a spring member connected between the hook member and the cam member so as to urge the hook member toward the engaged position and the cam member toward the retaining position; and
an unlatching control member connected to the cam member so as to rotate the cam member toward the release position when the unlatching control member is pulled.

6. The detachable vehicle seat according to claim 5, wherein the first connecting element comprises a first control cable connected between the seat blocking member and the recliner device, and the second connecting element comprises a second control cable connected between the seat latch and the recliner blocking member.

7. The detachable vehicle seat according to claim 6, wherein at least one of the first control cable and the second control cable includes a tension compensator.

8. The detachable vehicle seat according to claim 1, wherein the seat control device and the recliner control device each include an electrical actuator, and the first connecting element and the second connecting element comprise electric wires.

9. A method of assembling a detachable vehicle seat, comprising:
providing a seat cushion and a seatback pivotally attachable to the seat cushion;
attaching the seatback to the seat cushion via a recliner device which can be in a first state for locking the seatback in an upright use position and a second state for locking the seatback in a folded storage position selectively, so that the seatback can move between the upright use position and the folded storage position;
providing a recliner control device including a recliner control member and a recliner blocking member with the recliner device, the recliner control member selectively permits positioning of the seatback between the upright use position and a folded stowage position and the recliner blocking member can be selectively activated so as to prevent the recliner control member from causing the seatback to take the upright use position;

providing a seat latch with the seat cushion for selectively securing the seat cushion to a vehicle body;

providing a seat control device with the seat latch for selectively unlatching the seat latch;

connecting the recliner device to the seat control device by a first connecting element so that the seat latch can be unlatched only when the recliner device is in the second state; and connecting the seat latch to the recliner blocking member by a second connecting element so that the recliner device can take the first state only when the seat latch is fully latched.

\* \* \* \* \*